(12) United States Patent
Karim

(10) Patent No.: US 11,456,800 B2
(45) Date of Patent: *Sep. 27, 2022

(54) SYSTEMS AND METHODS FOR COMMUNICATING DATA OVER SATELLITES

(71) Applicant: Syed Karim, Chicago, IL (US)

(72) Inventor: Syed Karim, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/079,480

(22) Filed: Oct. 25, 2020

(65) Prior Publication Data

US 2021/0044350 A1 Feb. 11, 2021

Related U.S. Application Data

(63) Continuation-in-part of application No. 16/115,264, filed on Aug. 28, 2018, now Pat. No. 10,848,199.

(60) Provisional application No. 62/551,257, filed on Aug. 29, 2017.

(51) Int. Cl.
 *H04B 1/69* (2011.01)
 *H04B 7/185* (2006.01)

(52) U.S. Cl.
 CPC ........... *H04B 7/18526* (2013.01); *H04B 1/69* (2013.01); *H04B 7/18563* (2013.01); *H04B 2001/6912* (2013.01)

(58) Field of Classification Search
 CPC ..... H04L 27/34; H04L 27/362; H04L 1/0071; H04L 1/00741; H04L 25/03834; H04B 7/18526; H04B 7/216; H04B 1/69
 USPC .......................................................... 375/139
 See application file for complete search history.

(56) References Cited

U.S. PATENT DOCUMENTS

| 4,879,713 A | * | 11/1989 | Ichiyoshi | G01S 5/06 342/357.29 |
| 2004/0203340 A1 | * | 10/2004 | Oesterling | G07C 5/085 455/414.1 |
| 2005/0020238 A1 | * | 1/2005 | Eastman | H04H 60/74 455/403 |

* cited by examiner

*Primary Examiner* — Ted M Wang

(57) ABSTRACT

Systems for communicating data through a satellite are disclosed. The systems generally include a radio designed for terrestrial communications that is configured to uplink data to one or more satellites. The one or more satellites are configured to receive the data from the terrestrial radio. In addition, the systems include terrestrial receivers, such as one or more chirp spread spectrum radios, positioned at ground level, which are configured to receive the data from the one or more satellites.

11 Claims, 4 Drawing Sheets

SYSTEMS AND METHODS FOR COMMUNICATING DATA OVER SATELLITES

CROSS-REFERENCE TO RELATED APPLICATIONS

This application is a continuation-in-part application of U.S. patent application Ser. No. 16/115,264, filed on Aug. 28, 2018, which claims priority to, and incorporates by reference, U.S. provisional patent application Ser. No. 62/551,257, filed on Aug. 29, 2017.

FIELD OF THE INVENTION

The field of the present invention relates to systems and methods that involve the use of terrestrial transceivers for communicating data (such as media) over and from satellites. More particularly, the systems and methods involve the use of radios intended and originally designed for terrestrial applications, for communicating and receiving data over satellites.

BACKGROUND OF THE INVENTION

The many benefits of satellite-mediated communication have been known for years. In fact, as the global community and economy become more dependent upon Internet access and connectivity, the more important satellite-mediated communication will become. Such importance is particularly applicable for those located in rural and remote regions around the world, which cannot rely exclusively on terrestrial providers of Internet access. Likewise, the growing number of "Internet of Things" (IoT) applications will yield new and increasing demands for wireless communication among different devices, which are often reliant upon robust and reliable satellite communications.

In view of the foregoing, there is a continuing demand for new and improved methods and systems for communicating through satellites. As the following will demonstrate, the systems and methods described herein provide new and improved methods for communicating data through non-geostationary or geostationary satellites.

SUMMARY OF THE INVENTION

According to certain aspects of the present invention, systems for communicating data through one or more geostationary or non-geostationary satellites are provided. The systems generally include at least one radio originally designed for terrestrial applications, including but not limited to chirp spread spectrum (CSS) transceivers, which may be integrated into (or operate apart from) an optional satellite teleport. The terrestrial radio is configured to uplink data to one or more satellites (or may be placed directly on one or more satellites). The one or more satellites are configured to receive the data from the terrestrial radio and/or modulate a waveform intended to be used for terrestrial communications. In addition, the systems include one or more compatible receivers containing terrestrial radios, which are positioned at ground level and configured to receive the data from the one or more satellites. In certain embodiments, the transmission from the satellite may be, for example, compatible with 802.15.4, 802.11, BLE 5.2, LE Audio, ATSC 3.0, or LTE terrestrial transceivers. Still further, the invention provides that the systems may include a local oscillator and mixer that is configured to be combined with the satellite uplink, with the local oscillator and mixer being configured to operate at standard uplink frequencies of the various types of satellites.

According to additional aspects of the present invention, methods of using the systems described herein for communicating data through a satellite are provided. The invention provides that, in certain embodiments, such methods may be used to uplink data to the satellite, and/or downlink data from the satellite (using the systems described herein), for the purpose of streaming media to (and/or caching media within) local ground-level devices. Still further, the invention provides that such methods may be useful for "Internet of Things" (IoT) applications.

The above aspects of the present invention are further described and exemplified in the Detailed Description set forth below.

DETAILED DESCRIPTION OF THE INVENTION

Figure 1:
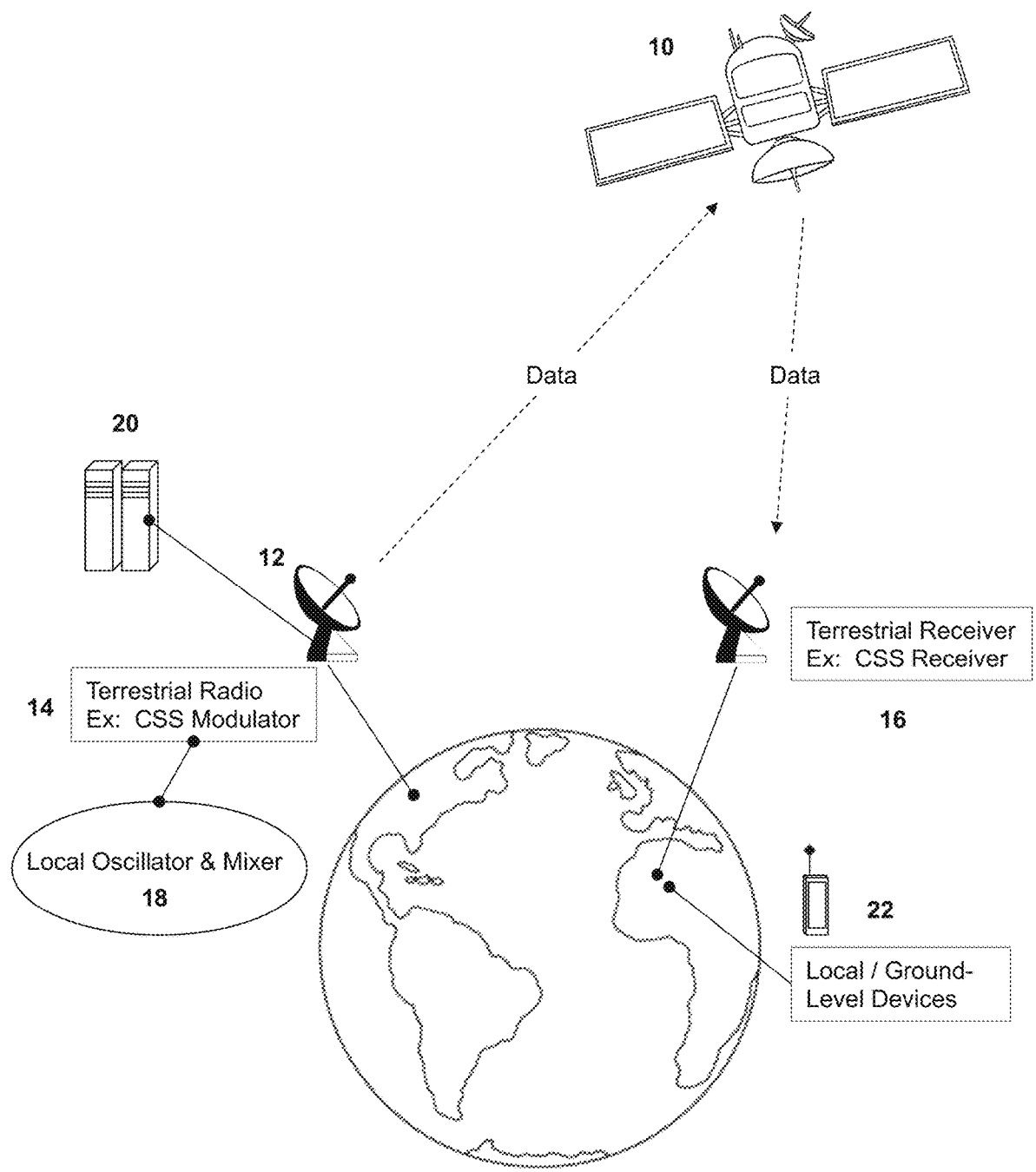
FIG. 1: a diagram that illustrates the various components of the systems described herein.

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Definitions

The terms "CSS" and "chirp spread spectrum" mean a digital spread spectrum protocol that employs wideband linear frequency modulated chirp pulses to encode data. In this context, a "chirp" consists of a sinusoidal signal having a frequency that increases or decreases as a function of time. A benefit to using CSS (as one example of a radio originally designed for terrestrial applications), in the systems and methods described herein, is that the CSS protocol is relatively resilient to channel noise. In addition, CSS is relatively resistant to multi-path facing, particularly when operating at relatively low power (as in the case of certain applications of the inventions described herein, such as the IoT applications referenced herein). Although CSS has been used in outdoor wireless communications, such applications have largely (if not completely) been terrestrial (and have not involved communications with non-geostationary or geostationary satellites).

The term "geostationary satellite" means a type of geosynchronous satellite that orbits the Earth, positioned at an altitude of approximately 35,800 kilometers (22,300 miles) directly over the equator of the Earth, which revolves in the same direction as the Earth rotates. The term "non-geostationary satellite" means a type of satellite that does not maintain a stationary position, but instead moves in relation to the Earth's surface, which includes medium-Earth orbit and highly-elliptical Earth orbit satellites.

The term "satellite teleport" or "satellite uplink" means a satellite ground station that is configured to operate as a hub, which connects a non-geostationary satellite or geostationary satellite with a terrestrial telecommunications network (such as the Internet).

The term "802.11 terrestrial transceiver" means a group of specifications defined by the Institute of Electrical and Electronics Engineers (IEEE), which apply to wireless local area network communications (also known as WLAN and WiFi).

The term "802.15.4 terrestrial transceiver" means Institute of Electrical and Electronics Engineers (IEEE) 802.15.4a (and IEEE 802.15.4a-2007).

The term "BLE 5.2" refers to a wireless technology standard used for exchanging data between fixed and mobile devices over short distances using UHF radio waves in the industrial, scientific and medical radio bands, from 2.402 GHz to 2.480 GHz.

The term "LE Audio" refers to a protocol for low power transmissions over Bluetooth.

The term "ATSC 3.0" refers to a terrestrial television broadcast and reception standard.

The term "LTE" refers to a wireless transmission technology employed by the mobile phone industry and adopted by the 3$^{rd}$ Generation Partnership Project.

Satellite Communication Systems

Referring now to FIG. 1, according to certain preferred embodiments of the present invention, systems for communicating data through one or more non-geostationary satellites and/or geostationary satellites 10 are provided. More particularly, the systems may, optionally, include a satellite terminal or teleport for uplinking 12 that is equipped with a radio originally designed and configured for terrestrial applications, such as a chirp spread spectrum modulator 14 (or, alternatively, a radio originally designed and configured for terrestrial applications, such as a chirp spread spectrum modulator 14, may be included separate and apart from a satellite teleport 12). In addition, according to such embodiments, the invention provides that the terrestrial radio may be a long-term evolution (LTE), ATSC 3.0, or Bluetooth 5.2 LE Audio device. The invention provides that the terrestrial radio, e.g., the chirp spread spectrum modulator 14 or long-term evolution (LTE), ATSC 3.0, or Bluetooth 5.2 LE Audio device, is configured to uplink data to the one or more satellites 10, including non-geostationary and/or geostationary satellites 10—or, in other embodiments, the satellite may be configured to directly produce a transmission that is compatible with radios designed and intended for terrestrial applications. The one or more satellites 10 are, in turn, configured to receive the data from the terrestrial radio, e.g., chirp spread spectrum modulator 14 (or, as mentioned above, are configured to produce radio transmissions compatible with terrestrial radios). In addition, the systems include terrestrial radios, such as one or more chirp spread spectrum receivers 16, positioned at ground level, which are configured to receive the data from the one or more satellites 10 (e.g., non-geostationary and/or geostationary satellites 10). Those of ordinary skill in the art will understand that "at ground level" (and similar phrases) should be construed to mean at or near ground level, e.g., including locations fixed to towers and aerial platforms. In certain embodiments, the invention provides that the transmission from the satellite 10 may be an 802.15.4 or 802.11 terrestrial transceiver (or otherwise compatible with such radios). In other embodiments, the satellite 10 may be configured to utilize BLE 5.2 (Bluetooth® Core Specification Version 5.2)/BLE LE Audio (Bluetooth® Low Energy), LTE, or ATSC 3.0 as the protocol to transmit data to, and receive data from, the one or more satellites 10.

Figure 2:
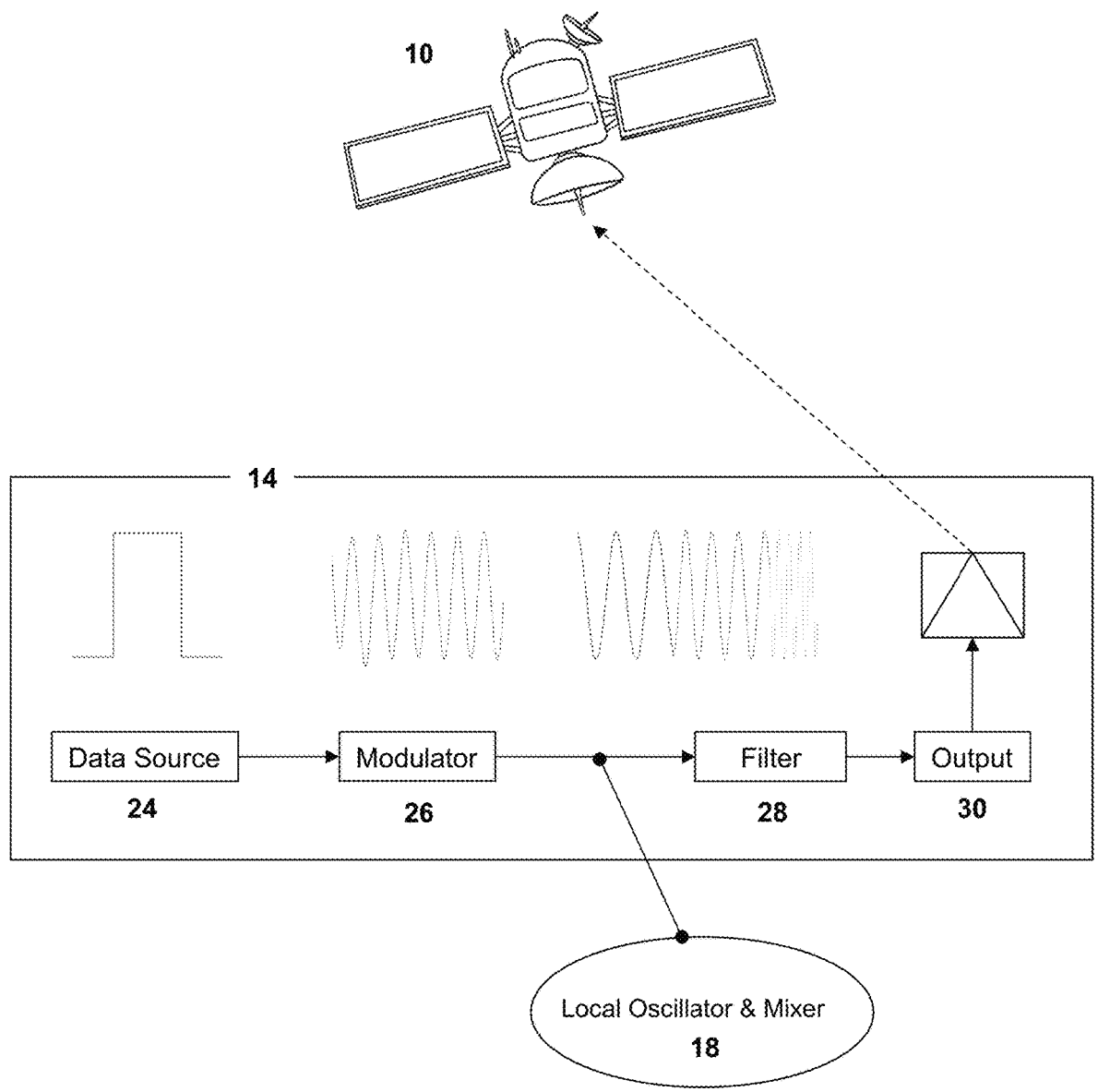
FIG. 2: a diagram that illustrates various components of a radio originally designed for terrestrial application, exemplified by the chirp spread spectrum modulator shown and described herein.

Referring now to FIG. 2, a diagram of a non-limiting example of a terrestrial radio (a chirp spread spectrum modulator 14) that may be used in the systems described herein is provided. As illustrated therein, the chirp spread spectrum modulator 14 is configured to receive data from a data source 24, which may consist of one or more servers 20 (FIG. 1), a computer, and/or other devices that are configured to generate and output digital data. The invention provides that the data are provided to a modulator 26 that converts the digital data into a modulated signal at a specified frequency (and, in some embodiments, differentially encodes the data onto an appropriate carrier, using an appropriate modulation scheme such as DPSK). The invention provides that the differentially encoded modulated signal is next converted from a continuous sinusoidal signal into a pulsed sinusoidal signal. In certain embodiments, the modulated data (consisting of a pulsed sinusoidal signal) are then provided to a filter 28, which is configured to convert the modulated signal into a chirp output signal (i.e., a filter 28 that expands the pulsed sinusoidal signal over a period of time), at which point the chirp output signal is provided to an output port 30. The output port 30—which will preferably comprise an antenna—is configured to transmit the chirp output signal to the one or more satellites 10 (e.g., non-geostationary and/or geostationary satellites 10). In addition, the invention provides that the output port 30 may be configured to allow a user to specify a preferred transmitting frequency and, optionally, to amplify the chirp output signal as desired.

Still further, the invention provides that the systems may include a local oscillator 18 (along with an associated mixer) that is configured to be combined with the satellite uplink/teleport 12 or reside within the satellite 10 described herein. In such embodiments, the invention provides that the local oscillator 18 and mixer are preferably configured to operate at standard intermediate frequencies of the uplink equipment, uplink frequencies of the satellite 10, and downlink frequencies of the satellite. 10. As used herein, the term "local oscillator" means an electrical oscillator, which is typically used along with a mixer, to change the frequency of a signal. The frequency modification process, which is sometimes referred to as "heterodyning," produces the sum and difference frequencies from the frequency of the local oscillator 18 and the frequency of the input signal. A local oscillator, when combined with a mixer, is often referred to as a "frequency converter."

Figure 3:
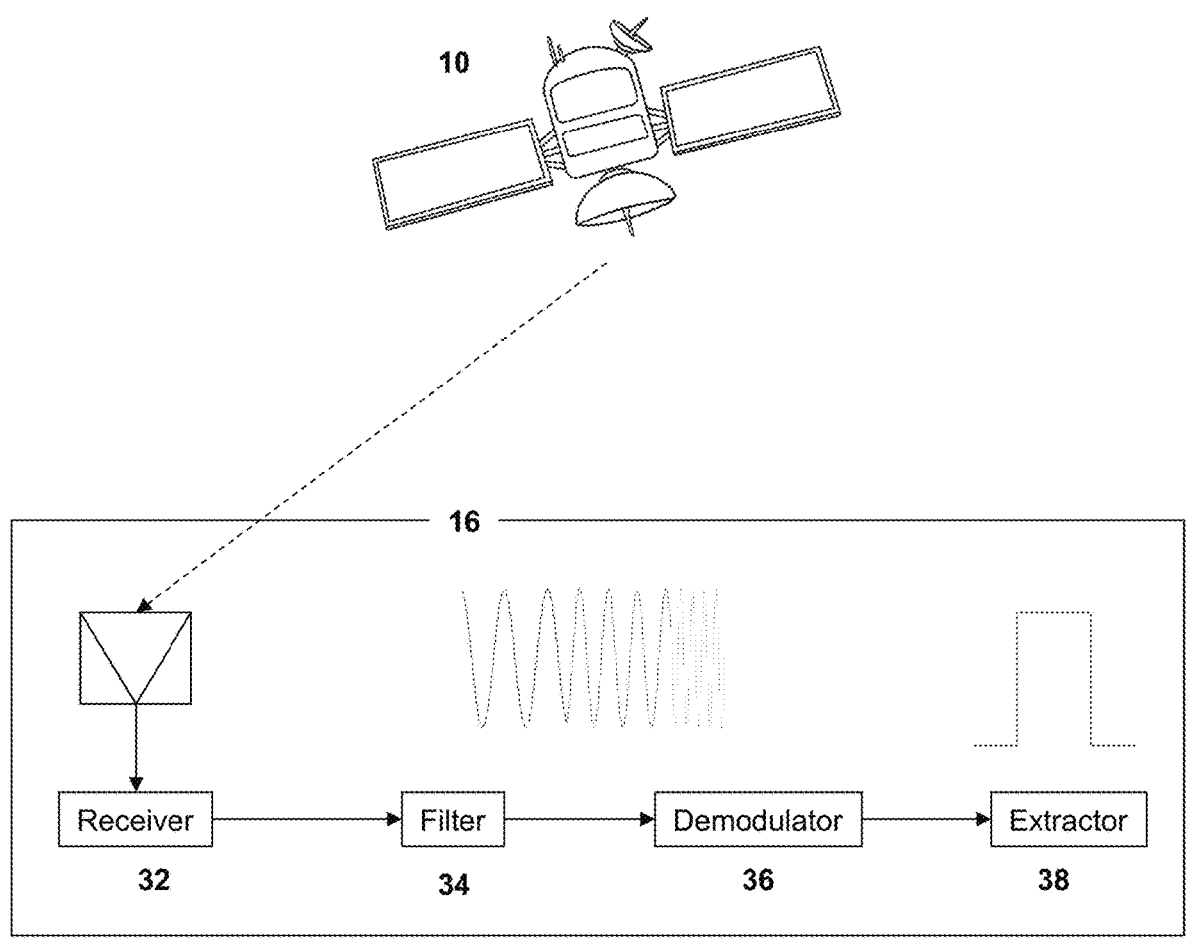
FIG. 3: another diagram that illustrates various components of a radio originally designed for terrestrial application, exemplified by the chirp spread spectrum modulator shown and described herein.

Referring now to FIG. 3, a diagram of a non-limiting example of a chirp spread spectrum receiver 16 that may be used in the systems described herein is provided. More particularly, as shown therein, the chirp spread spectrum receiver 16 will preferably include a CSS signal receiver component 32 (e.g., an antenna). Upon receiving the chirp output signal, the signal may be converted from the transmitted frequency into a frequency that is compatible with one or more dispersive filters 34 (in addition, in certain embodiments, upon receiving the chirp output signal, the signal may also be amplified prior to further processing). The invention provides that the one or more dispersive filters 34 are preferably configured to collate and harmonize overlapping chirp output signals. The invention provides that the processed signal is then preferably provided to a phase demodulator 36 (such as a differential phase demodulator 36), which is an electronic circuit (or computer program in a software-defined radio) that is configured to recover the data content from the modulated signal. The invention provides that the phase demodulator 36 is configured to then transmit the recovered data content to an extractor 38, which can be accessed by other devices to obtain the demodulated data content from the chirp spread spectrum receiver 16.

Still further, in certain embodiments, the invention provides that the satellite teleport or uplink equipment 12 may be operably connected to (or in communication with) one or more servers 20 (e.g., through an Internet connection), which may represent a source of data (e.g., the data source 24) that are uplinked to the one or more satellites, where the satellites 10 may immediately relay or store the data onboard for future transmissions. According to such embodiments, the systems of the invention (and methods described below) provide a wireless and effective means for transferring data via satellites 10 from one or more servers 20 to many different (and far away) locations around the globe.

Satellite Communication Methods

Figure 4:
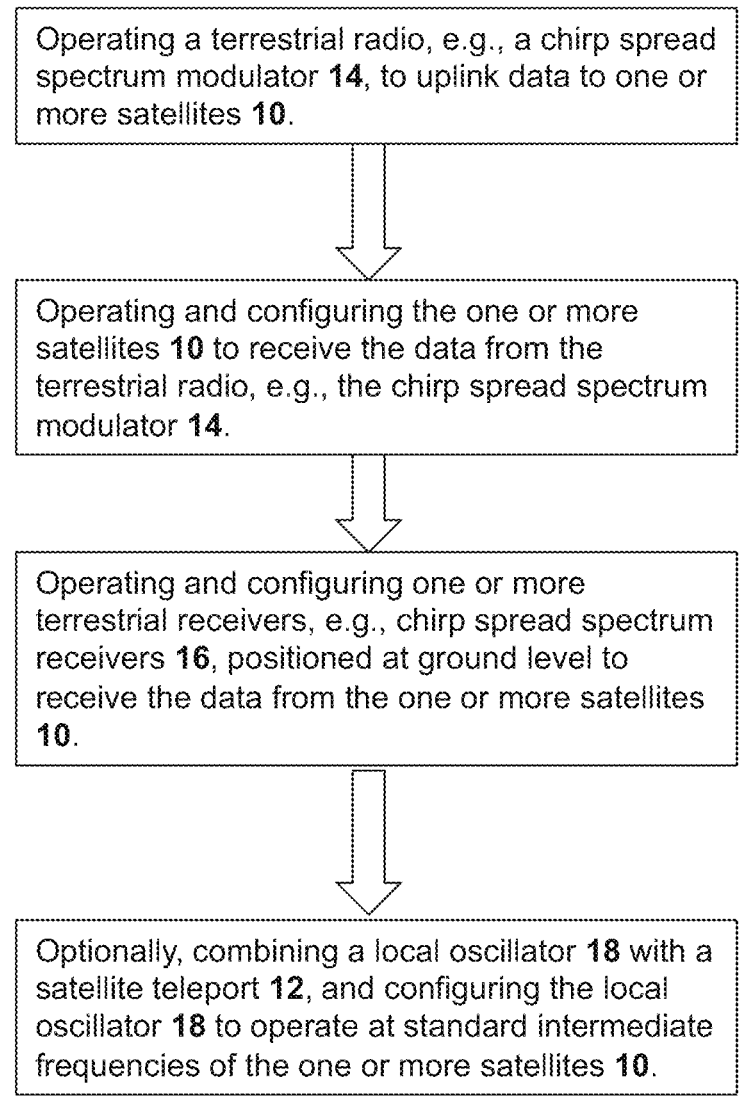
FIG. 4: a flow chart that summarizes the various steps of the methods described herein.

Referring now to FIG. 4, according to additional preferred embodiments of the present invention, methods of using the systems described herein for communicating data through a satellite (e.g., non-geostationary and/or geostationary satellites 10) are provided. More specifically, for example, the methods include the following general steps: operating a satellite 10 or satellite teleport/uplink equipment 12 that comprises a terrestrial radio (such as, but not limited to, a chirp spread spectrum modulator 14 or other transmission which is compatible with a terrestrial radio) to uplink data over one or more satellites 10; operating and configuring the one or more satellites 10 to receive the data from the terrestrial radio (e.g., the chirp spread spectrum modulator 14); and operating and configuring one or more terrestrial receivers (e.g., chirp spread spectrum receivers 16) positioned at ground level to receive the data from the one or more satellites 10. In addition, the invention provides that such methods may, optionally, further include combining a local oscillator 18 (along with an associated mixer) with the satellite teleport/satellite uplink equipment 12, and configuring the local oscillator 18 (and the associated mixer) to operate at standard frequencies of the one or more satellites 10.

The invention provides that, in certain embodiments, such methods may be used to uplink data to the one or more satellites 10, and downlink data from the satellites 10, for the purpose of streaming media to (and/or caching media within) local ground-level devices 22. More particularly, such methods may be used to uplink data to the one or more satellites 10, and downlink data from the satellites 10, for the purpose of streaming and relaying media to (and caching media within) local ground-level devices 22. The invention provides that the local ground-level devices 22 may include low-power wireless area network transceivers, wireless local area network transceivers, and/or terrestrial broadcast receivers. As used herein, the terms "data" and "media" include, but are not limited to, (a) media and internet protocol data that originate from one or more servers that are operably connected to, or in communication with, the terrestrial radio and/or (b) media and communications data related to a data link and network layers of an open systems interconnection (OSI) model of computer networking. This media and data may additionally be stored and served directly from the one or more satellites 10. In addition, in certain embodiments, the invention provides that the local ground-level devices 22 may include low-power wireless area network transceivers, which may be particularly useful in "Internet of Things" (IoT) applications. That is, when the local ground-level devices 22 include low-power wireless area network transceivers, the systems and methods described herein may be particularly useful for enabling interconnection and communication among a plurality of user-oriented computing devices, e.g., embedded in everyday objects, which enables such devices to send and receive data via satellites 10.

The many aspects and benefits of the invention are apparent from the detailed description, and thus, it is intended for the following claims to cover all such aspects and benefits of the invention which fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A system for communicating data through a satellite, which comprises:
   (a) at least one satellite, wherein the satellite is a non-geostationary satellite or a geostationary satellite; and
   (b) a terrestrial radio positioned at ground level, which is configured to receive data from the at least one satellite and transfer the data to local ground-level devices, wherein the data that is transmitted from the satellite, and the data that the terrestrial radio receives from the satellite, comprises:
      (i) media and internet protocol data that originate from one or more servers that are operably connected to, or in communication with, a transmitter which is compatible with terrestrial radios; and/or
      (ii) media and communications data related to a data link and network layers of an open systems interconnection (OSI) model of computer networking, wherein the terrestrial radio demodulates a chirp spread spectrum carrier and the at least one satellite is configured to transmit the data to a plurality of chirp spread spectrum radios positioned at ground level.

2. The system of claim 1, which further comprises a second terrestrial radio that is configured to uplink data to the at least one satellite using terrestrial communication protocols selected from the group consisting of 802.15.4, 802.11, LTE, BLE 5.2, LE Audio, and ATSC 3.0 terrestrial communication protocols.

3. The system of claim 2, which further includes a local oscillator, and an associated mixer, which is configured to be combined for satellite uplinking, wherein the local oscillator is configured to operate at standard radio frequencies of the at least one satellite.

4. The system of claim 1, wherein the terrestrial radio is operably combined with a local oscillator, and an associated mixer, wherein the local oscillator is configured to operate at standard radio frequencies of the at least one satellite.

5. The system of claim 1, wherein the terrestrial radio is a long-term evolution (LTE) device.

6. The system of claim 1, wherein the terrestrial radio is configured to receive the data from the at least one satellite using terrestrial communication protocols selected from the group consisting of 802.15.4, 802.11, LTE, BLE 5.2, LE Audio, and ATSC 3.0 terrestrial communication protocols.

7. A method for communicating data through a satellite, which comprises:
(a) transmitting data from a satellite, wherein the satellite is a non-geostationary satellite or a geostationary satellite; and
(b) operating and configuring a terrestrial radio positioned at ground level to receive the data from the satellite and transfer the data to local ground-level devices, wherein the data is (i) media and internet protocol data that originate from one or more servers that are operably connected to, or in communication with, a transmitter which is compatible with terrestrial radios and/or (ii) media and communications data related to a data link and network layers of an open systems interconnection (OSI) model of computer networking, wherein the terrestrial radio demodulates a chirp spread spectrum carrier and said method further comprises operating and configuring the satellite to transmit the data to a plurality of chirp spread spectrum radios positioned at ground level.

8. The method of claim 7, which further comprises combining a local oscillator, and an associated mixer, for satellite uplinking, and configuring the local oscillator to operate at standard radio frequencies of the satellite.

9. The method of claim 7, which further comprises uplinking data to the satellite, and downlinking data from the satellite, to cache, stream, and relay media and internet protocol data within the local ground-level devices.

10. The method of claim 9, wherein the local ground-level devices consist of low-power wireless area network transceivers, wireless local area network transceivers, and/or terrestrial broadcast receivers.

11. The method of claim 7, wherein (a) the terrestrial radio is a long-term evolution (LTE) device and (b) said method further comprises operating and configuring the satellite to transmit the data to a plurality of long-term evolution (LTE) devices positioned at ground level.

* * * * *